United States Patent
Lyon et al.

(10) Patent No.: US 9,445,305 B2
(45) Date of Patent: Sep. 13, 2016

(54) LOW ENERGY BEACON ENCODING

(75) Inventors: James M. Lyon, Redmond, WA (US); Hugh A. Teegan, Bellevue, WA (US); Thomas Kuehnel, Seattle, WA (US); Vishal Soni, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 13/230,667

(22) Filed: Sep. 12, 2011

(65) Prior Publication Data

US 2013/0065584 A1 Mar. 14, 2013

(51) Int. Cl.
*H04W 4/00* (2009.01)
*H04W 28/06* (2009.01)
*H04W 48/12* (2009.01)
*H04W 84/18* (2009.01)

(52) U.S. Cl.
CPC ............. *H04W 28/06* (2013.01); *H04W 4/008* (2013.01); *H04W 48/12* (2013.01); *H04W 84/18* (2013.01)

(58) Field of Classification Search
USPC .......................... 455/434; 370/300, 310, 312
See application file for complete search history.

(56) References Cited

U.S. PATENT DOCUMENTS

| | | | |
|---|---|---|---|
| 6,868,256 B2 | 3/2005 | Dooley | |
| 7,003,283 B2 | 2/2006 | Hiltunen | |
| 7,715,354 B2 | 5/2010 | Arunan | |
| 7,929,471 B2 * | 4/2011 | Oksman | 370/300 |
| 8,411,586 B2 | 4/2013 | Kwa | |
| 2002/0077060 A1 | 6/2002 | Lehikoinen et al. | |
| 2006/0194581 A1 | 8/2006 | Kang et al. | |
| 2006/0285528 A1 | 12/2006 | Gao et al. | |
| 2007/0053315 A1 | 3/2007 | Sugaya | |
| 2007/0242643 A1 | 10/2007 | Chandra et al. | |
| 2007/0300004 A1 | 12/2007 | Yun | |
| 2008/0101264 A1 | 5/2008 | Li | |

(Continued)

FOREIGN PATENT DOCUMENTS

| | | |
|---|---|---|
| CA | 2772100 A1 | 3/2011 |
| CN | 101094148 A | 12/2007 |

(Continued)

OTHER PUBLICATIONS

Lewicki et al., "Power Consumption Analysis of a Bluetooth Over Ultra Wide Band System," *IEEE*, <http://ieeexplore.ieee.org/stamp/stamp.jsp?arnumber=04380949>, pp. 241-246, Published Date: Sep. 24-26, 2007.

(Continued)

*Primary Examiner* — Kevin C Harper
*Assistant Examiner* — Henry Baron
(74) *Attorney, Agent, or Firm* — Judy Yee; Micky Minhas

(57) ABSTRACT

Techniques and tools are described for transmitting beacon messages using a wireless communication protocol, such as the Bluetooth Low Energy protocol. In some examples, beacon messages can be generated in a compact format and included in an AdvData portion of a payload of a protocol data unit of a Bluetooth Low Energy advertising channel packet. A beacon message can be transmitted from a stationary beacon generation device and broadcast to an area within a transmission range of the beacon generation device, and mobile computing devices, such as mobile phones, can receive the beacon message and perform one or more actions in response to information contained in the beacon message, all while conserving energy used by the beacon generation device and the mobile computing device.

20 Claims, 8 Drawing Sheets

(56) References Cited

U.S. PATENT DOCUMENTS

| | | |
|---|---|---|
| 2008/0129881 A1 | 6/2008 | Shao et al. |
| 2009/0003278 A1* | 1/2009 | Abdel-Kader ........ H04W 48/18 370/331 |
| 2009/0028108 A1 | 1/2009 | Sherman |
| 2009/0097428 A1 | 4/2009 | Kneckt et al. |
| 2009/0232041 A1 | 9/2009 | Smith |
| 2009/0245195 A1 | 10/2009 | Bhattad |
| 2010/0142365 A1 | 6/2010 | Richardson |
| 2011/0074552 A1 | 3/2011 | Norair |
| 2012/0257561 A1* | 10/2012 | Redding ........................ 370/312 |
| 2012/0258669 A1* | 10/2012 | Honkanen et al. ......... 455/67.11 |
| 2013/0028155 A1* | 1/2013 | Zang et al. .................... 370/310 |

FOREIGN PATENT DOCUMENTS

| | | |
|---|---|---|
| CN | 101715119 B | 5/2010 |
| EP | 2216964 A1 | 8/2010 |
| JP | 2007258811 A | 10/2007 |
| WO | 2011000391 A1 | 1/2011 |

OTHER PUBLICATIONS

"Specification of the Bluetooth System, Experience More," Bluetooth Version 4.0, 2302 pages, Publication Date: Jun. 30, 2010.

International Search Report and Written Opinion for International Application No. PCT/US2012/054839, mailed May 16, 2013, 10 pages.

First Office Action and Search Report in China Patent Application No. 201210335375.4, Mailed Date: Sep. 5, 2014, 12 Pages.

"Le Controller Specification", ULP Working Group, Feb. 6, 2009, 122 Pages.

"Search Report Received for European Patent Application No. 12846541.6", Mailed Date: Apr. 29, 2015, 3 Pages.

"Office Action Issued in European Patent Application No. 12846541.6", Mailed Date: May 13, 2015, 9 Pages.

"Second Office Action and Search Report Received for Chinese Patent Application No. 201210335375.4", Mailed Date: May 28, 2015, 11 Pages.

Notice of Allowance Issued in Japanese patent Application No. 2014-529979, Mailed date: May 31, 2016, 3 Pages. (w/o English Translation).

* cited by examiner

FIG. 5

| EX. TYPE | DESCRIPTION | LENGTH OF TYPED PAYLOAD | COMMENT |
|---|---|---|---|
| 0 | RESERVED | 0 | |
| 1 | LOCATION | DEPENDS ON ACCURACY PROVIDED | INFORMS DEVICE OF GEOGRAPHIC LOCATION, E.G., WGS84, LAT/LON |
| 2 | SILENCE REQUESTED | 0 | INFORMS DEVICE THAT SILENT MODE SHOULD BE USED |
| 3 | FLIGHT MODE REQUESTED | 0 | INFORMS DEVICE THAT FLIGHT MODE SHOULD BE USED |
| 4 | HANDS FREE MODE ONLY | 0 | INFORMS DEVICE THAT HANDS FREE MODE MAY BE REQUIRED |
| 5 | LOCAL TIME | VARIABLE | INFORMS DEVICE OF LOCAL TIME |
| ... | ... | ... | |

| EX. TYPE | DESCRIPTION | LENGTH (OCTETS) | COMMENT |
|---|---|---|---|
| FF04 | STORE COUPONS | VARIABLE | PAYLOAD COMPRISES URL WHERE COUPONS CAN BE RETRIEVED |
| FF21 | FESTIVAL ATTENDEE PHONE APP BEACON | VARIABLE | PAYLOAD COMPRISES INFO FOR PHONE APP, E.G., WHICH FESTIVAL VENUE THE BEACON REPRSENTS |
| FF25 | SECURITY ACCESS | VARIABLE | REQUESTS IDENTIFICATION DATA FROM DEVICE |
| ... | ... | ... | |

LOW ENERGY BEACON ENCODING

BACKGROUND

Even when not being used by a user, mobile computing devices typically communicate with a cellular network at intervals to send and receive data for various purposes, such as updating the time, determining the location of the mobile computing device, or checking signal strength. These communications are often instigated by the mobile computing devices by sending a message to the network and receiving some form of response. These actions can use a significant amount of energy and reduce the battery life of the mobile computing device.

For communicating with other mobile devices over relatively short distances, Bluetooth® wireless technology has become increasingly popular, allowing a mobile computing device to communicate wirelessly with another nearby device without having to route the communication through a network of remote devices, such as satellites and cell towers.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Techniques and tools are described for transmitting beacon messages using a wireless communication protocol, such as the Bluetooth Low Energy protocol. In some examples, beacon messages can be generated in a compact format and included in an AdvData portion of a payload of a protocol data unit (PDU) of a Bluetooth Low Energy advertising channel packet. A beacon message can be transmitted from a stationary beacon generation device and broadcast to an area within a transmission range of the beacon generation device, and mobile computing devices, such as mobile phones, can receive the beacon message and perform one or more actions in response to information contained in the beacon message, all while requiring minimal energy use by beacon generation device and the mobile computing device.

The beacon messages can be formatted in a compact beacon message format that can include one or more type octets followed, if necessary, by a typed payload. The one or more type octets can comprise data that indicates an advertising type for the beacon message. The typed payload can contain additional data. Data contained in the beacon message can be specific to the location of the beacon generation device, such as a request for the mobile computing device to switch to silent mode or flight mode while in the area of the beacon generation device.

In some examples, the mobile computing device can receive a beacon message in sleep mode and process the beacon message without awaking from sleep mode, in order to conserve energy. In some examples, the mobile computing device can display a message to a user in response to a beacon message. In some examples, a beacon message can comprise a request for the mobile computing device to respond with identification information, such as to obtain security access. In some examples, a beacon message can contain a URL or other address from which the mobile computing device can retrieve additional information.

The foregoing and other objects, features, and advantages of the invention will become more apparent from the following detailed description, which proceeds with reference to the accompanying figures.

BRIEF DESCRIPTION OF THE DRAWINGS

FIG. 5 is a chart describing exemplary advertising types.

FIG. 6 is a chart describing exemplary extended advertising types.

DETAILED DESCRIPTION

Figure 1:
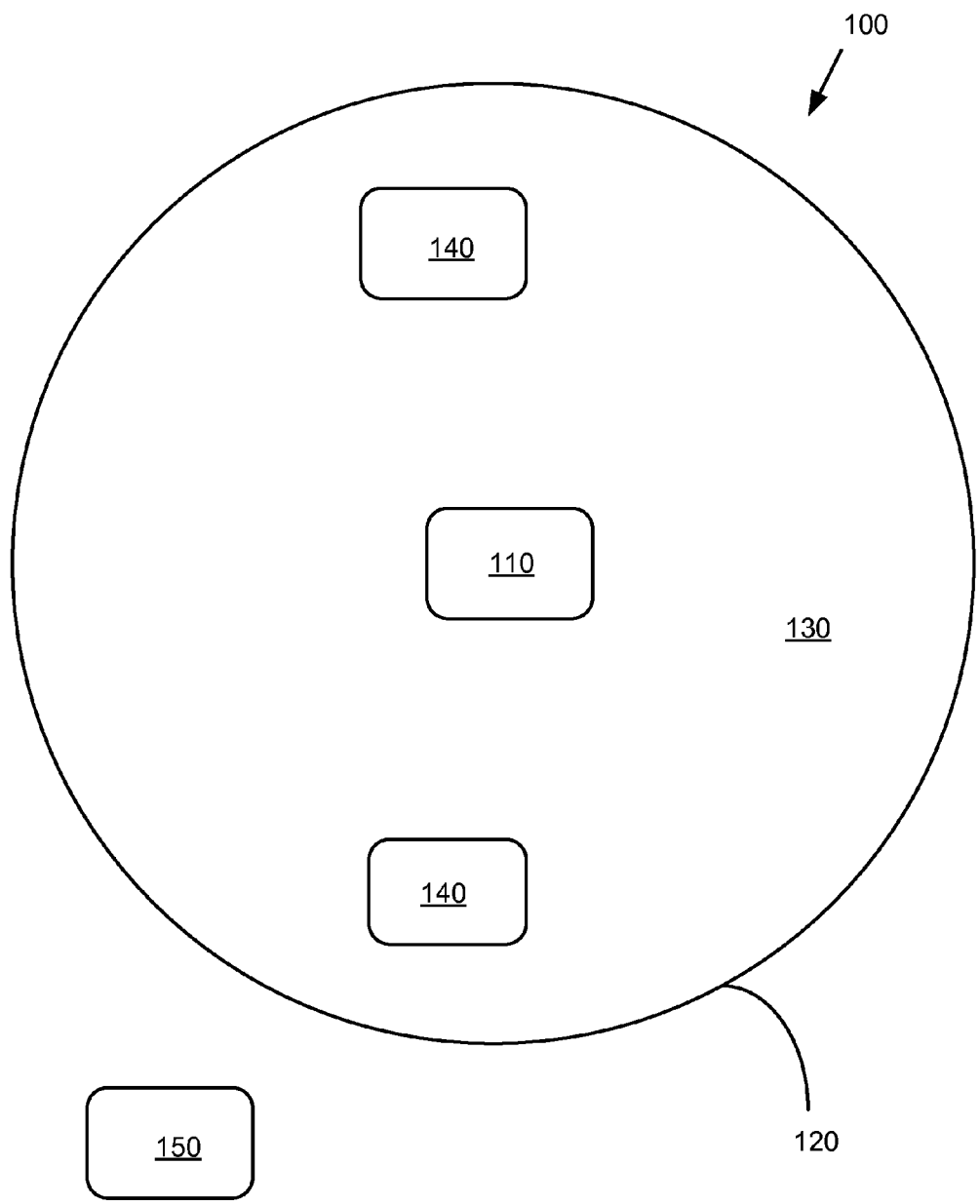
FIG. 1 is a diagram depicting exemplary mobile computing devices within an exemplary transmission range of an exemplary beacon generation device.

The following description is directed to techniques and solutions for transmitting beacon messages using a wireless communication protocol (e.g., a low energy wireless communication protocol). For example, compact beacon messages can be transmitted from a beacon generation device to one or more mobile computing devices using a Bluetooth Low Energy wireless communication protocol. However, the techniques and solutions described herein can be applicable to many types of systems wherein a beacon message is wirelessly transmitted from one device to one or more other devices over a relatively short range.

The techniques and solutions described herein can also be applied to wireless communication protocols that may not be classified as low energy protocols. For example, the techniques and solutions described herein can be applied to transmitting beacon messages using other wireless communication protocols, such as Wi-Fi® (e.g., by transmitting the beacon messages within beacon frames of the Wi-Fi protocol).

In the techniques and solutions described herein, a beacon message refers to a message that is sent, or broadcast, repeatedly or constantly from a transmitting device to an area within a range of the transmitting device to be received by any properly configured receiving device located within that area, and which carries some information associated with the transmitting device or the location of the transmitting device. A beacon message can also be called an advertising message by some protocols, such as Bluetooth Low Energy.

Bluetooth Low Energy

Bluetooth Low Energy (BLE) is an exemplary wireless communication protocol that can be used to transmit beacon messages as described herein with low energy cost. The BLE specification ("BLE Specification") is defined in Volume 6 of the Bluetooth Specification Version 4.0, published Jun. 30, 2010. The BLE system uses short wavelength radio transmissions in the 2.4 GHz ISM band at 2400-2483.5 MHz and uses 40 RF channels that are 2 MHz wide. BLE can use a radio technology called frequency-hopping spread spectrum, which chops up the data being sent and transmits chunks of it on across the different channels. BLE transmissions can have a variable range, such as about 50 m, an over-the-air data rate of about 1 Mb/s, and a power consumption of about 1% to about 50% of that of Classis Bluetooth, depending on the application.

BLE comprises plural link layer states, including an advertising state. The link layer in the advertising state can transmit advertising channel packets and can optionally listen to and respond to responses triggered by these advertising channel packets. A BLE device in the advertising state is known as an advertiser.

In BLE, the 40 RF channels are allocated into two physical channels: an advertising channel and a data channel. The advertising physical channel uses three RF channels for discovering devices, initiating a connection and broadcasting data. The data physical channel uses up to 37 RF channels for communication between connected devices. The link layer uses one physical channel at a given time.

Figure 4:
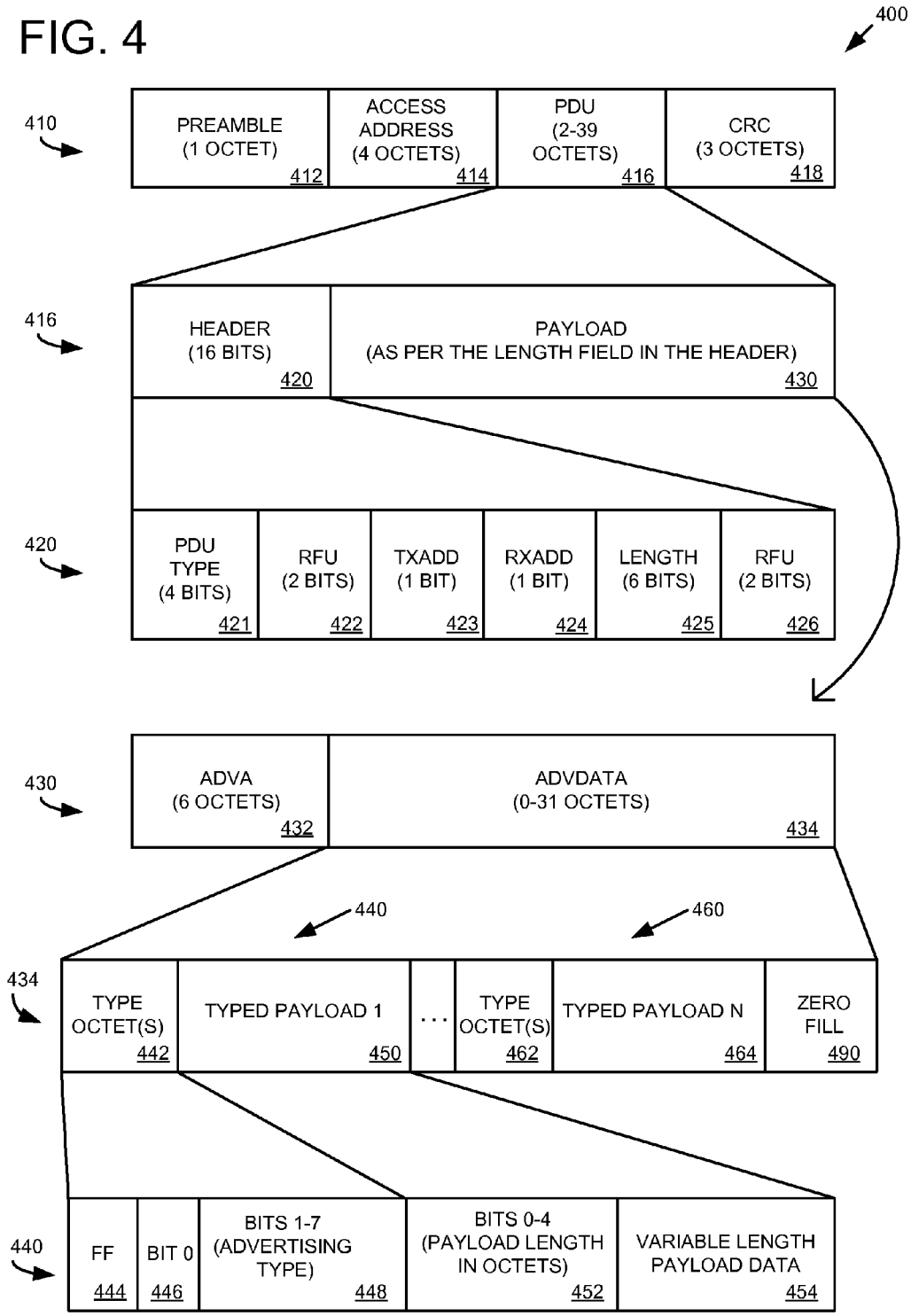
FIG. 4 is a block diagram depicting an exemplary format for beacon messages.

The BLE link layer has only one packet format used for both advertising channel packets and data channel packets. The packet format is shown in FIG. 4 at 410. Each packet consists of four fields: the preamble 412, the access address 414, the protocol data unit (PDU) 416, and the cyclic redundancy check (CRC) 418. When a packet is transmitted in an advertising physical channel, the PDU is called the advertising channel PDU, and when a packet is transmitted in a data physical channel, the PDU is called the data channel PDU.

The advertising channel PDU 416 has a 16-bit header 420 and a variable size payload 430. The PDU type field 421 of the advertising channel PDU that is contained in the header 420 indicates the PDU type. There are currently 7 PDU types, some of which are discussed below. The length field 425 indicates the length of the payload 430 in octets. The valid range of the length field 425 is 6 to 37 octets. The RFU field 422, TxAdd field 423, RxAdd field 424 and RFU field 426 are not discussed herein.

The following advertising channel PDU types are used in the specified events:

ADV_IND: used in connectable undirected advertising events;

ADV_DIRECT_IND: used in connectable directed advertising events;

ADV_NONCONN_IND: used in non-connectable undirected advertising events;

ADV_SCAN_IND: used in scannable undirected advertising events.

These PDU types are sent by the link layer in the advertising state.

The PDU types ADV_IND, ADV_NONCONN_IND and ADV_SCAN_IND are each used in "undirected" advertising events, meaning that a transmission is broadcast to no particular receiver, but can be received by any properly configured device within the transmission range of the sending device. The ADV_IND type can be used to establish a connection with one or more receiving device, whereas the ADV_NONCONN_IND type can be used for non-connectable, or one-way, communications to one or more receiving devices, and the ADV_SCAN_IND type can be used in scanning advertising events.

The payload 430 for all three of the PDU types ADV_IND, ADV_NONCONN_IND and ADV_SCAN_IND is the same. The payload 430 consists of an AdvA field 432 and an AdvData field 434. The AdvA field 432 contains 6 octets for the advertiser's public or random device address. The AdvData field 434 can contain 0 to 31 octets of advertising data from the advertiser's host. Octets 0 and 1 of the AdvData field 434 can be reserved for manufacturer data, leaving octets 2 through 31 for advertising data, though when such manufacturer data is not needed, all octets 0 through 31 can be used for advertising data.

Exemplary Beacon System

FIG. 1 is a diagram depicting an exemplary beacon system 100. The system can comprise at least one beacon generation device 110 configured to generate and transmit at least one beacon message using a low-energy wireless communication protocol, such as BLE. The beacon message can have a transmission range 120, such as a specified maximum distance (e.g., about 50 m) from the beacon generation device 110. The transmission range 120 can vary depending on a plurality of factors. Any properly configured device within an area 130 defined by the range 120 can receive the beacon message. The system 100 can further comprise one or more mobile computing devices 140 within the area 130 that are configured to receive the beacon message. Devices located outside of the range 120, such as device 150, may not receive messages from the beacon generation device 110. Exemplary beacon generation devices and mobile computing devices are described in more detail below in the section entitled "Exemplary Devices."

Exemplary Method for Transmitting a Beacon Message

Figure 2:
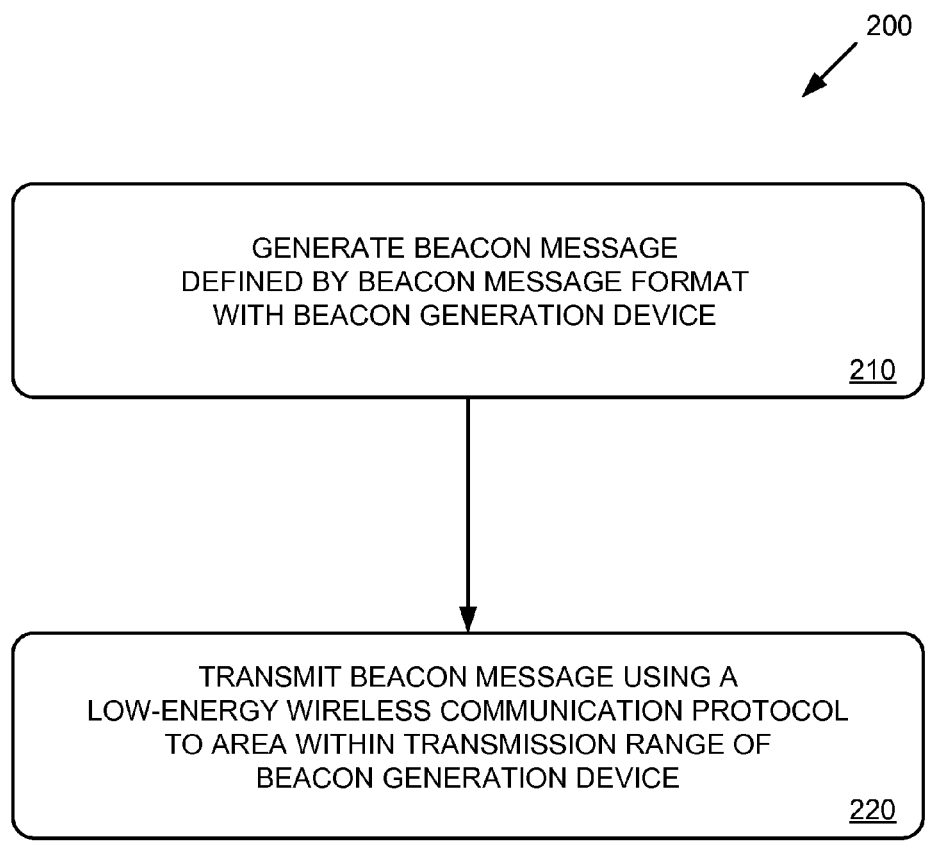
FIG. 2 is a block diagram depicting an exemplary method for transmitting beacon messages.

FIG. 2 is a block diagram depicting an exemplary method 200 for transmitting beacon messages. At 210, at least one beacon message can be generated with a beacon generation device, such as the device 110 in FIG. 1. The generated beacon message can be defined by a beacon message format. At 220, the generated beacon message can be transmitted, with the beacon generation device, using a low-energy wireless communication protocol to an area, such as the area 130, within a transmission range, such as the range 120, of the beacon generation device for reception by one or more mobile computing devices, such as the devices 140, located in the transmission area.

Exemplary Method for Receiving a Beacon Message

Figure 3:
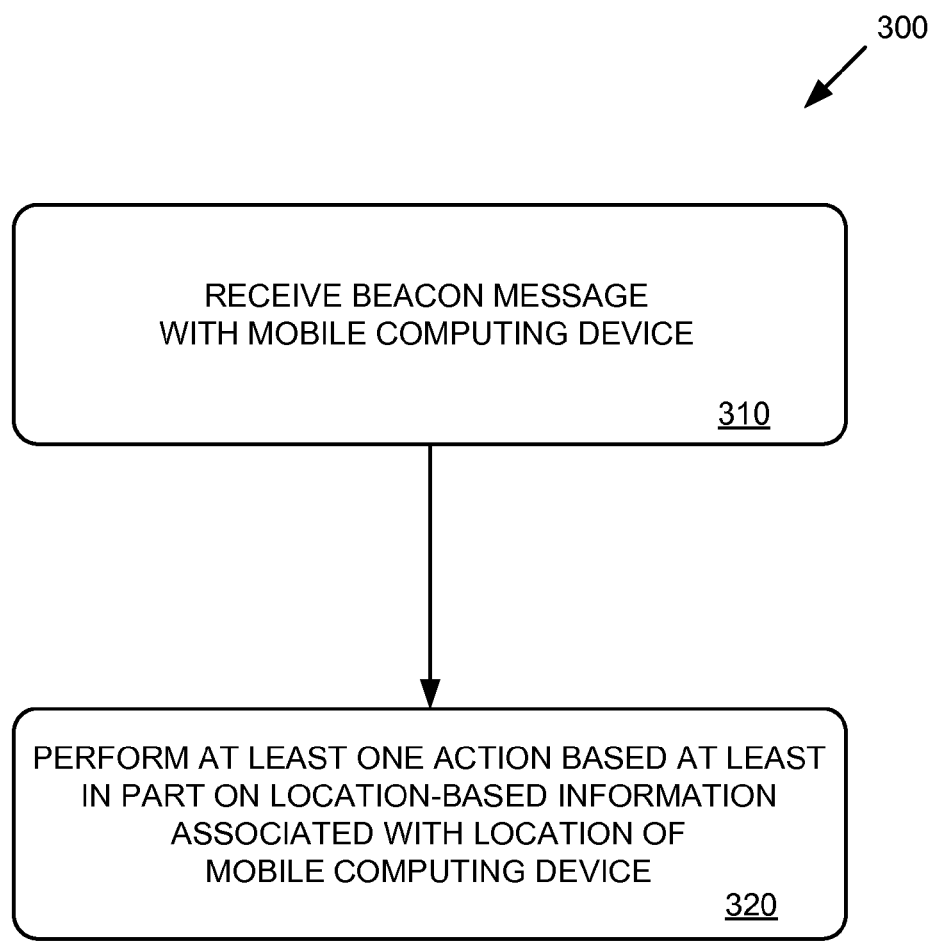
FIG. 3 is a block diagram depicting an exemplary method for receiving beacon message.

FIG. 3 is a block diagram depicting an exemplary method 300 for receiving beacon messages. At 310, at least one beacon message can be received with a mobile computing device, such as the device 140 in FIG. 1. The beacon message can be transmitted in a low-energy wireless communication protocol. At 320, the at least one action can be performed by the mobile computing device based at least in part on location-based information associated with a location of the mobile computing device when it received the beacon message. This action can be performed without input from a user of the mobile computing device.

Exemplary Beacon Message Format

Beacon messages can be defined by a beacon message format such that the beacon messages can be transmitted with a specific low-energy wireless communication protocol. It is also desirable for the beacon message format to require a minimal volume of data in order to conserve energy and include as many beacon messages as possible in each packet. In some examples, a beacon message format can allow for a variable length or size of the beacon message depending on the purpose of the beacon message or the type of the beacon message. For example, some beacon messages can be as short as a couple bits or one octet, while other beacon messages can be as long as the maximum size allowed by the communication protocol being used, such as to transmit complex data requiring many octets.

In some embodiments, when the low-energy wireless communication protocol comprises BLE, one or more beacon messages can be formatted such that they can be included in an AdvData field 434 of a payload 430 of a PDU 416 of a data channel packet 410 (see FIG. 4). As shown in FIG. 4, the AdvData field 434 can contain 0 to 31 octets of data. A beacon message in the AdvData field 434 must therefore also comprise no more than 31 octets of data, or else be parsed into multiple chunks sent in different data channel packets 410. More typically, however, a plurality of beacon messages can be contained in the AdvData field 434 of a single data channel packet 410. For example, FIG. 4 shows a first beacon message 440 and an $N^{th}$ beacon message 460, indicating N total beacon messages, contained in a single AdvData field 434. The beacon message format exemplified in beacon messages 440 and 460 in FIG. 4 are not limited to use with BLE, but instead can be used with other low-energy, or non-low-energy, wireless communication protocols, such as Wi-Fi.

As shown in FIG. 4, an exemplary beacon message format can comprise one or more type octets 442, including at least a main type octet that comprises a first bit 446 followed by seven type bits 448. Additional type octets can also be included in some beacon messages, such as an extension type octet 444. The beacon message format can further comprise a typed payload 450, if necessary. Some beacon messages can include a typed payload, and others can not include a typed payload. The typed payload 450 can comprise a payload length 452 followed by payload data 454.

The seven type bits 448 can indicate an advertising type for the beacon message 440. The advertising type can be one of a set of predetermined advertising types that indicate location-based information associated with a location of the beacon generation device and/or a location of the mobile computing device that receives the beacon message.

The first bit 446 can be either a "0" or a "1". The first bit 446 being a "0" can indicate that the beacon message has no typed payload 450 and that no subsequent type octets are present in the beacon message. The first bit 446 being a "0" can indicate that the main type octet is the last type octet and the main type octet is the end of the beacon message. In such a beacon message, all the information necessary to affect the intended message can be included in and/or implied by the seven type bits 448.

The first bit 446 being a "1" can indicate that a subsequent one or more octets of the beacon message comprise a typed payload for the beacon message. The typed payload 450 can comprise a payload length field 452 followed by payload data field 454. The payload length field 452 can comprise the length in octets of the typed payload 450, including the payload length field 452 itself. The payload length field 452 can comprise 5 bits (e.g., bits 0-4) of the first octet of the typed payload 450. 5 bits can be sufficient to indicate a typed payload length of up to 32 octets. When the beacon message is included in an AdvData field in BLE, the typed payload 450 is limited to no more than 30 octets, in which case a 5-bit long payload length field 452 can be sufficient. In other embodiments, the payload length field 452 can be more or fewer than 5 bits, depending on the maximum size of the typed payload 450 allowed by the wireless communication protocol with which the beacon message is to be transmitted. In the case where the payload length field 452 is 5 bits long, the typed payload 450 can be contained in a single octet if the payload data field 454 is 3 bits or fewer.

Some beacon messages can comprise an extension type octet, such as the octet 444 in FIG. 4, preceding the first bit 446 of the main type octet. The extension type octet can indicate that the advertising type of the beacon message is an extended advertising type. The extension type octet 444, when present in a beacon message, can comprise an 8 bit combination that the main type octet is not permitted to comprise, according to the beacon message format. For example, the extension type octet 444, when present, can always comprise "11111111", "FF", or some other predetermined octet, while the main type octet can be permitted to comprise any other 8 bit combination. Because the extension type octet is unique from the main type octet, the two can be distinguished by a receiving device. In some examples, more than one extension type octet 444 can be included preceding the main type octet. The extension type octets 444 can be included in a beacon message when the total number of possible predetermined advertising types exceeds 128, the amount of different advertising types that can be indicated by the seven type bits 448. Each extension type octet 444 preceding the main type octet can be effective to double the number of different advertising types that can be indicated by the type octets 442.

In the cases where one or more beacon messages are transmitted in a given portion or field of a protocol that has a length requirement (e.g., the length of the data transmitted in the given portion or field must be a certain number of octets), additional bits, such as a zero fill 490, can be added subsequent to the last beacon message in the given portion or field such that the total length of the one or more beacon messages plus the additional bits equals a desirable length. These additional bits can carry meaningless information, and can simply be a string of "0" bits, for example.

Exemplary Advertising Types

FIGS. 5 and 6 list a plurality of exemplary advertising types 448 for beacon messages 440. The list 500 in FIG. 5 comprises exemplary regular advertising types (i.e., advertising types that are not extended advertising types) and the list 600 in FIG. 6 comprises exemplary extended advertising types. As indicated, some advertising types are associated with no typed payload 450, while other advertising types are associated with fixed length or variable length typed payloads. It can be desirable for the advertising types most commonly used and/or those that are associated with lengthy typed payloads 450 to be regular advertising types, because beacon messages with extended advertising types are at least one octet longer (due to the extension type octet(s) 444) than beacon messages with regular advertising types and have less space for the typed payload 450.

The advertising type of a beacon message can be one of a set of predetermined advertising types. Each predetermined advertising type can be defined to indicate a specific message (e.g., command, suggestion, request, or other useful information) to a mobile computing device that receives the beacon message. Mobile computing devices can be pre-configured to know what idea each of the predetermined advertising types indicates. Thus, with a beacon message of just one octet in length (if the advertising type is associated with no typed payload), a beacon generation device can communicate to a receiving mobile computing device a whole variety of specific messages. The compact nature of such a beacon message, in addition to the fact the mobile computing device does not need to request the message or otherwise initiate communication with the beacon generation device, can reduce the energy cost associated with communicating the message, both for the advertiser and for the receiver. In many common scenarios, further energy savings can arise because the beacon message conveys to the receiving device sufficient information such that the receiving device can understand the beacon message and react to it without the need to further communicate with other external entities to obtain additional information (e.g., the "silence requested" beacon discussed below can convey all the information the receiving device needs to switch the device to silent mode without recourse to further external look-ups via radio or other wireless communication that would consume more energy).

An exemplary advertising type that is not associated with a typed payload is a "silence requested" advertising type in which the beacon message requests that any receiving mobile computing devices switch to silent mode. This advertising type can be used, for example, in a movie theater or in a classroom. In one example, a stationary beacon generation device can be mounted in a movie theater such that the range of the beacon transmission includes the whole theater but not the hallway areas outside of the theater. When any mobile computing devices that are configured to receive and understand the beacon message receive the beacon message (when they enter the theater), the mobile computing device can automatically understand that it should switch to silent mode. Depending on its settings, the mobile computing device can either automatically switch to silent mode without input from a user, or it can display a message to the user asking if the user would like to switch to silent mode.

Another exemplary advertising type that is not associated with a typed payload is a "flight mode requested" advertising type, such as for use in an airplane, in which the beacon message requests that any receiving mobile computing devices switch to a flight mode configuration, which can be mean, for example, that the antenna is turned off and/or the device is in silent mode. When any mobile computing devices that are configured to receive and understand the beacon message receive the beacon message (e.g., when they enter the airplane), the mobile computing device can automatically understand that it should switch to flight mode. Depending on its settings, the mobile computing device can either automatically switch to flight mode without input from a user, or it can display a message to the user asking if the user would like to switch to flight mode.

Another exemplary advertising type that is not associated with a typed payload is a "hands-free mode only" advertising type, such as for use in an automobile, in which the beacon message informs that any receiving mobile computing devices may be required to only operate in hands-free mode.

Other exemplary advertising types can be associated a variable or fixed length typed payload. One exemplary advertising type that is associated with a variable length typed payload is a "location" advertising type in which the beacon message informs receiving mobile computing devices of the geographic location of the beacon generation device and/or the receiving mobile computing device. The payload data for a beacon message of this "location" advertising type can comprise a string of bits that indicates the geographic location, such as WGS84 longitude and latitude. More bits can be used to indicate higher resolution locations, and fewer bits can be used to indicate lower resolution locations.

Another exemplary advertising type that is associated with a variable length typed payload is a "local time" advertising type in which the payload data of the beacon message contains local time information. Different sizes of payloads can be used depending on the time accuracy desired.

Some exemplary advertising types can be associated with beacon messages that contain a URL or other address information in the payload which a receiving mobile computing device can use to look up and retrieve location-based information from another location. In an exemplary advertising type "store coupons," (example advertising type FF04 in FIG. 6), the beacon message can include URL information in its payload indicating a website from which store coupons can be retrieved. For example, a grocery store can have a beacon generation device located in or near the store that transmits these "store coupon" type beacon messages. Any mobile computing device near the store can receive the beacon messages and retrieve, or download, up-to-date coupons from the indicated website for use in the store. The length of the payload data indicating the URL in such a case can vary depending on the length of the URL.

Some exemplary advertising types can be associated with beacon messages can contain information in the payload for use with an application (an "app") for a mobile computing device. The example advertising type FF21 shown in FIG. 6, called "Festival Attendee Phone App Beacon", is an example of such an advertising type. The payload of such a beacon message can comprise information that can be used by an app. For example, the payload can contain information regarding performances at a particular festival venue where the beacon generation device is located.

Some exemplary advertising types can be associated with beacon messages that request identifying information from the receiving mobile computing devices. For example, example advertising type FF25 in FIG. 6 can be used for security access. In one example, a beacon generation device located at a security access location (e.g., a parking garage gate, or an office entrance) and can transmit a beacon message that requests that any receiving mobile computing device respond with a security access code. In some cases, such a beacon message can have no payload and simply request security access information. In other cases, the beacon message can include a fixed length payload that contains identifying information specific to that particular security access location (a user might have access to some doors and not to others). The receiving mobile computing device can be configured to respond to the security access beacon message with a general security code, with information identifying the particular mobile computing device and/or with information identifying a user of the mobile computing device. Such a response by the receiving mobile computing device can be performed automatically in response to receiving the beacon message, or can be performed after receiving authorization from a user.

Exemplary Beacon Messages

Figure 7:
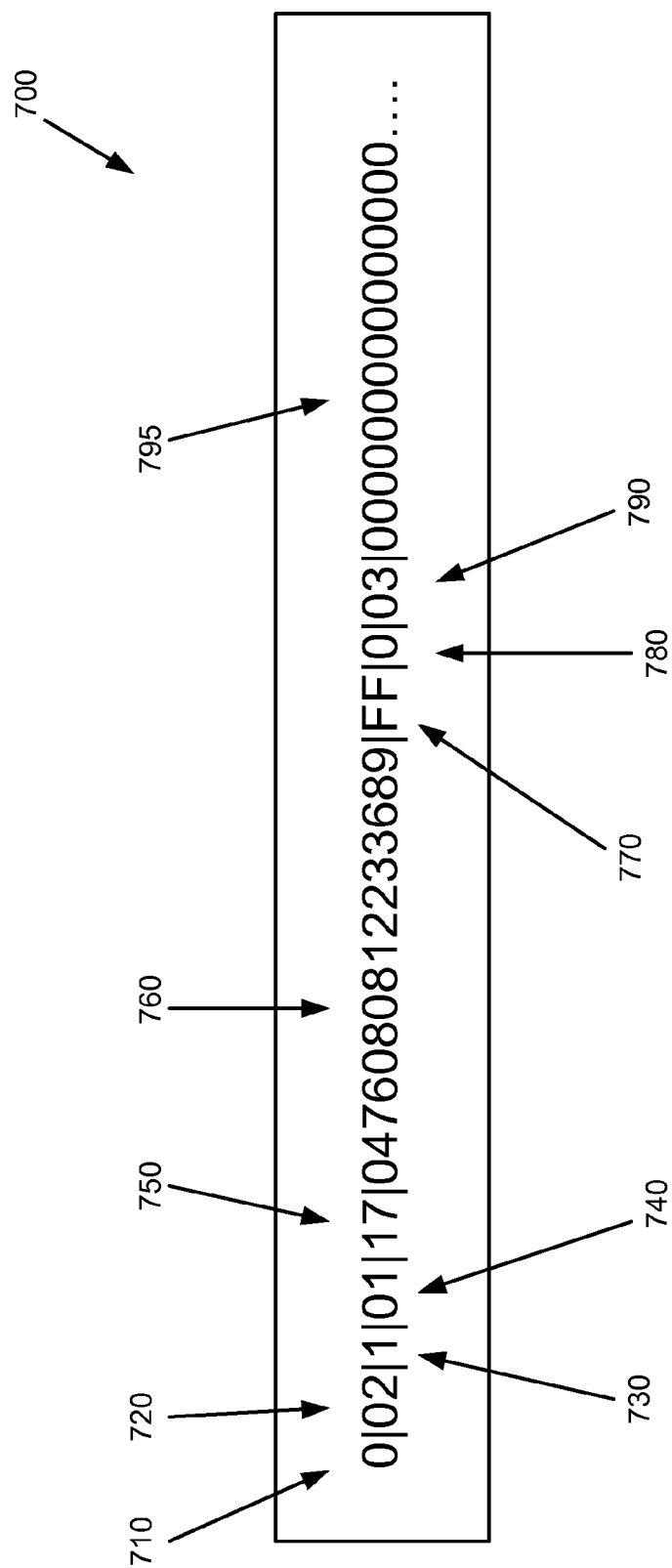
FIG. 7 shows an exemplary beacon message.

FIG. 7 shows an exemplary sentence 700 that comprises plural exemplary beacon messages and a zero fill 795 at the end. The sentence 700 can be formatted to be included in the AdvData field 434 of a PDU 416 of a BLE advertising packet 410 (see FIG. 4). This exemplary sentence 700 includes a group of beacon messages that can be generated and transmitted by the same beacon generation device and can include related messages that are associated with the location of the beacon generation device. In the particular example of the sentence 700, the beacon messages are all related a particular building having a wheelchair accessible entrance and wherein mobile computing devices should be in silent mode.

The exemplary sentence 700 comprises a first beacon message "0|02" wherein the first "0" indicated at 710 comprises the first bit 446 of a main type octet 442 and the following "02" indicated at 720 comprises the seven type bits 448 of the main type octet 442. The fact that the first bit is a "0" indicates that the beacon message has no typed payload and that no subsequent type octets are present in the beacon message. Thus, this is a one-octet beacon message having a regular advertising type and no typed payload. The advertising type "02" corresponds to the example advertising type 2 shown in FIG. 5, which indicates to a receiving mobile computing device that silent mode should be used.

The second beacon message in the sentence 700 is "1|01|17|0476080812233689". The first "1" indicated at 730 comprises the first bit 446 of a main type octet 442 and the following "01" indicated at 740 comprises the seven type bits 448 of the main type octet 442. The fact that the first bit is a "1" indicates that a subsequent one or more octets of the beacon message comprise a typed payload for the beacon message. The advertising type "01" indicated at 740 corresponds to the example advertising type 1 shown in FIG. 5, which indicated to a receiving mobile computing device that the payload data comprises data indicating the geographic location of the beacon generation device (e.g., the WGS84 coordinates of the building where the beacon generation device is located). The "17" indicated at 750 comprises the 5-bit long payload length field 452 of the typed payload, and the "0476080812233689" indicated at 760 comprised the payload data of the beacon message (e.g., the WGS84 coordinates). The typed payload of this beacon message is 17 octets long, as indicated by the payload length field 750, making the entire beacon message 18 octets long.

The third beacon message in the sentence 700 is "FF|0|03". The "FF" indicated at 770 comprises an extension type octet 444, which indicates that the advertising type of this beacon message is an extended advertising type. The "0" indicated at 780 comprises the first bit 446 of a main type octet 442 and the following "03" indicated at 790 comprises the seven type bits 448 of the main type octet 442. The fact that the first bit is a "0" indicates that the beacon message has no typed payload and that no subsequent type octets are present in the beacon message. Thus, this is a two-octet beacon message having an extended advertising type entitled "FF03" and no typed payload. The advertising type "FF03" is not shown in FIG. 5 or 6, but indicates to a receiving mobile computing device that a wheelchair accessible entrance is present.

The three exemplary beacon messages included in the exemplary sentence 700 comprise a total of 21 octets. If, for example, these beacon messages are transmitted in wireless communication protocol field that requires a specific fixed length, then a zero fill 795 can be appended to the beacon messages to make the sentence 700 the desired total length.

Exemplary Actions in Response to Receiving a Beacon Message

After receiving a beacon message, a mobile computing device can be configured to perform one or more actions in response to the beacon message. Some exemplary responsive actions can be performed without any input from a user of the mobile computing device, while other exemplary responsive actions can require input from a user prior to being performed by the mobile computing device.

One exemplary action that a mobile computing device can perform in response to a received beacon message without input from a user is displaying a message to a user of the mobile computing device. Such a displayed message can depend on the advertising type of the beacon message. For example, in response to receiving a "silence requested" beacon message, the mobile computing device can be configured to display a message to the user indicating that silence is requested and/or asking the user for input as to whether or not the user would like to switch the mobile computing device to silent mode. Other exemplary displayed messages can comprise information associated with the location of the beacon generation device and/or the location of the receiving mobile computing device, such as the name of a building or the presence of a wheelchair accessible entrance.

Another exemplary action that a mobile computing device can perform in response to a received beacon message without input from a user is automatically adjusting a local setting of the receiving mobile computing device. Automatically switching to silent mode or flight mode are examples of this type of action.

In some examples, a mobile computing device can be configured to receive a beacon message in sleep mode and process the beacon message in firmware without awaking from sleep mode. As used herein, the term "sleep mode" can mean any conventional low power consumption mode, such as a sleep mode, standby mode, suspend mode, or other similar mode wherein the mobile computing device attempts to conserve power by turning off the display screen, antenna, hard drive and/or other functions that are not necessary, and from which the mobile computing device can switch to an active mode without having to boot up or reboot. As used herein, the term "firmware" means a fixed or semi-fixed program and/or data structure in a given hardware device that internally controls the given electronic hardware device, and without which the given hardware device would be non-functional. For example, a mobile computing device can be configured to receive a "silence requested" beacon messages while in sleep mode, and then switch the device to silent mode using firmware without the phone awaking from sleep mode. This can save significant battery life for mobile computing device. A majority of beacon messages that a mobile computing device receives can have advertising types that do not require any user input or a responsive communication by the mobile computing device. In these situations, a processor of the mobile computing device would significantly drain the battery of it acted in response to all received beacons. By configuring the mobile computing device to receive and process certain beacon signals in firmware, the processor need not act in response to these beacon messages, saving significant energy. A user can adjust the settings/preferences of the mobile computing device to decide which advertising types the device should automatically react to without awaking, which advertising types it should awaken in response to and react to, and/or which advertising types it should ignore.

Another exemplary action that a mobile computing device can perform in response to a received beacon message without input from a user is wirelessly transmitting data comprising information specific to the mobile computing device or specific to a user/owner of the mobile computing device. For example, in response to a "security access" beacon message, the mobile computing device can transmit data comprising information identifying the mobile computing device and/or a user or owner of the mobile computing device. Such data can be transmitted back to the beacon generation device and/or to another computing device at a remote location, such as a security access terminal located in another building, in order to gain access to a secured area. In some examples, the date transmitted by the mobile computing device in response to such a beacon message can further comprise at least a portion of the beacon message itself, such data identifying the beacon generation device that is located in the payload of the beacon message. Thus, a remote security access terminal can receive data indicating both what security access is requested and who/what is requesting such access. In some embodiments, all of this can be performed automatically by the mobile computing device without input from a user, and optionally using firmware while the mobile computing device remains in sleep mode.

Exemplary Devices

Figure 8:
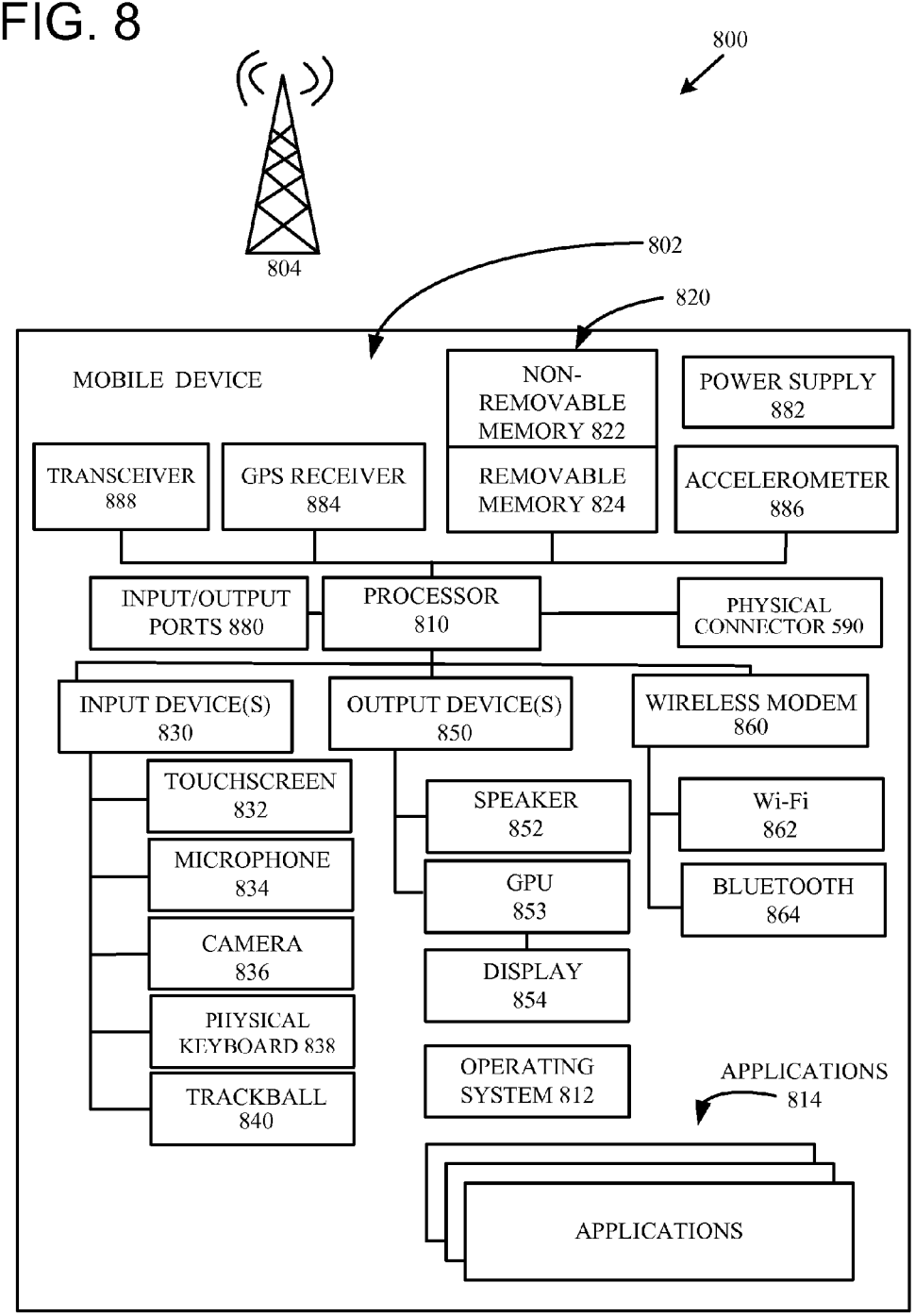
FIG. 8 is a block diagram illustrating an example mobile computing device in conjunction with which techniques and tools described herein may be implemented.

FIG. 8 depicts a detailed example of a device 800, such as a beacon generation device or a mobile computing device, capable of implementing the techniques and solutions described herein. The device 800 includes a variety of optional hardware and software components, shown generally at 802. In general, a component 802 in the device 800 can communicate with any other component of the device, although not all connections are shown, for ease of illustration. The device 800 can be any of a variety of computing devices (e.g., cell phone, smartphone, handheld computer, laptop computer, notebook computer, tablet device, netbook, media player, Personal Digital Assistant (PDA), camera, video camera, etc.) and can allow wireless two-way communications with one or more communications networks 804, such as a Wi-Fi, cellular, or satellite network.

The illustrated device 800 includes a controller or processor 810 (e.g., signal processor, microprocessor, ASIC, or other control and processing logic circuitry) for performing such tasks as signal coding, data processing, input/output processing, power control, and/or other functions. An operating system 812 controls the allocation and usage of the components 802 and support for one or more applications 814 such as software components that implement one or more of the innovative features described herein. In addition, the application programs can include common mobile computing applications (e.g., telephony applications, email applications, calendars, contact managers, web browsers, messaging applications), or any other computing application.

The illustrated device 800 includes memory 820. Memory 820 can include non-removable memory 822 and/or removable memory 824. The non-removable memory 822 can include RAM, ROM, flash memory, a hard disk, or other well-known memory storage technologies. The removable memory 824 can include flash memory or a Subscriber Identity Module (SIM) card, which is well known in Global System for Mobile Communications (GSM) communication systems, or other well-known memory storage technologies, such as "smart cards." The memory 820 can be used for storing data and/or code for running the operating system 812 and the applications 814. Example data can include web pages, text, images, sound files, video data, or other data sets to be sent to and/or received from one or more network servers or other devices via one or more wired or wireless networks. The memory 820 can be used to store a subscriber identifier, such as an International Mobile Subscriber Identity (IMSI), and an equipment identifier, such as an International Mobile Equipment Identifier (IMEI). Such identifiers can be transmitted to a network server to identify users and equipment.

The device 800 can support one or more input devices 830, such as a touchscreen 832 (e.g., capable of capturing finger tap inputs, finger gesture inputs, or keystroke inputs for a virtual keyboard or keypad), microphone 834 (e.g., capable of capturing voice input), camera 836 (e.g., capable of capturing still pictures and/or video images), physical keyboard 838), buttons and/or trackball 840 and one or more output devices 850, such as a speaker 852 and a display 854 (e.g., with an associated graphics processing unit (GPU) 853)). Other possible output devices (not shown) can include piezoelectric or other haptic output devices. Some devices can serve more than one input/output function. For example, touchscreen 832 and display 854 can be combined in a single input/output device.

The device 800 can provide one or more natural user interfaces (NUIs). For example, the operating system 812 or applications 814 can comprise speech-recognition software as part of a voice user interface that allows a user to operate the device 800 via voice commands. For example, a user's voice commands can be used to provide input to a map navigation tool.

A wireless modem 860 can be coupled to one or more antennas (not shown) and can support two-way communications between the processor 810 and external devices, as is well understood in the art. The modem 860 is shown generically and can include, for example, a cellular modem for communicating at long range with the mobile communication network 804, a Bluetooth-compatible modem 864 (such as a BLE—compatible modem), or a Wi-Fi-compatible modem 862 for communicating at short range with an external Bluetooth-equipped device or a local wireless data network or router. The wireless modem 860 is typically configured for communication with one or more cellular networks, such as a GSM network for data and voice communications within a single cellular network, between cellular networks, or between the device 800 and a public switched telephone network (PSTN).

The device 800 can further include at least one input/output port 880, a power supply 882, a satellite navigation system receiver 884, such as a Global Positioning System (GPS) receiver, sensors 886 such as an accelerometer, a gyroscope, or an infrared proximity sensor for detecting the orientation and motion of device 800, and for receiving gesture commands as input, a transceiver 888 (for wirelessly transmitting analog or digital signals) and/or a physical connector 890, which can be a USB port, IEEE 1394 (FireWire) port, and/or RS-232 port. The illustrated components 802 are not required or all-inclusive, as any of the components shown can be deleted and other components can be added.

The device 800 can determine location data that indicates the location of the device based upon information received through the satellite navigation system receiver 884 (e.g., GPS receiver). Alternatively, the device 800 can determine location data that indicates location of the device in another way. For example, the location of the device can be determined by triangulation between cell towers of a cellular network. Or, the location of the device can be determined based upon the known locations of Wi-Fi routers in the vicinity of the device. The location data can be updated every second or on some other basis, depending on implementation and/or user settings. Regardless of the source of location data, the device 800 can provide the location data to a map navigation tool for use in map navigation. For example, the map navigation tool periodically requests, or polls for, current location data through an interface exposed by the operating system 812 (which in turn may get updated location data from another component of the device 800), or the operating system 812 pushes updated location data through a callback mechanism to any application (such as the map navigation tool) that has registered for such updates.

The device 800 can implement the technologies described herein. For example, the Bluetooth-compatible modem 864 and/or the transceiver 888 can be used to send and/or receive beacon messages using BLE. The applications 814 can include various components configured to cause the device to perform various actions in response to a received beacon message, such as displaying a message on the display 854, receiving input from a user with the input devices 830, switching the device to a silent mode, or communicating with the network 804. At least some of these actions can be performed using firmware.

The device 800 can be part of an implementation environment in which various types of services (e.g., computing services) are provided by a computing "cloud." For example, the cloud can comprise a collection of computing devices, which may be located centrally or distributed, that provide cloud-based services to various types of users and devices connected via a network such as the Internet. Some tasks (e.g., processing user input and presenting a user interface) can be performed on local computing devices (e.g., connected devices) while other tasks (e.g., storage of data to be used in subsequent processing) can be performed in the cloud.

Although FIG. 8 illustrates a device 800, more generally, the techniques and solutions described herein can be implemented with devices having other screen capabilities and device form factors, such as a desktop computer, a television screen, or device connected to a television (e.g., a set-top box or gaming console). Services can be provided by the cloud through service providers or through other providers of online services. Thus, the techniques and solutions described herein can be implemented with any of the connected devices as a client computing device. Similarly, any of various computing devices in the cloud or a service provider can perform the role of server computing device and deliver data to the connected devices.

Alternatives and Variations

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions or a computer program product stored on one or more computer-readable storage media (e.g., non-transitory computer-readable media, such as one or more optical media discs such as DVD or CD, volatile memory components (such as DRAM or SRAM), or nonvolatile memory components (such as hard drives)) and executed on a computer (e.g., any commercially available computer, including smart phones or other mobile devices that include computing hardware). Any of the computer-executable instructions for implementing the disclosed techniques as well as any data created and used during implementation of the disclosed embodiments can be stored on one or more computer-readable media (e.g., non-transitory computer-readable media). The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C++, Java, Perl, JavaScript, Adobe Flash, or any other suitable programming language. Likewise, the disclosed technology is not limited to any particular computer or type of hardware. Certain details of suitable computers and hardware are well known and need not be set forth in detail in this disclosure.

The disclosed methods, apparatus, and systems should not be construed as limiting in any way. Instead, the present disclosure is directed toward all novel and non-obvious features and aspects of the various disclosed embodiments, alone and in various combinations and sub-combinations with one another. The disclosed methods, devices, and systems are not limited to any specific aspect or feature or combination thereof, nor do the disclosed embodiments require that any one or more specific advantages be present or problems be solved. In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. We therefore claim as our invention all that comes within the scope of these claims.

We claim:

1. A method for transmitting a beacon message using a Bluetooth Low Energy protocol, the method comprising:
    generating, with a beacon generation device, at least one beacon message for transmission in an AdvData field of a payload of a protocol data unit (PDU) of a Bluetooth Low Energy advertising channel packet, wherein the at least one beacon message is defined by a beacon message format, the beacon message format comprising one or more type octets, the one or more type octets comprising a main type octet comprising a first bit followed by seven type bits, the seven type bits indicating an advertising type for the beacon message, the advertising type being one of a set of predetermined advertising types that indicate location-based information associated with a location of the beacon generation device, the first bit being either:
    a first bit value, to indicate that the beacon message has no typed payload and that no subsequent type octets are present in the beacon message; or
    a second bit value, opposite of the first bit value, to indicate that a subsequent one or more octets of the beacon message comprise a typed payload for the beacon message, the typed payload comprising a payload length field followed by payload data field, the payload length field being the length in octets of the typed payload; and transmitting, with the beacon generation device, the at least one beacon message in an AdvData field of a payload of a PDU of a Bluetooth Low Energy advertising channel packet to a transmission area within a transmission range of the beacon generation device for reception by one or more mobile computing devices located in the transmission area.

2. The method of claim 1, wherein the first bit is the second bit value and the beacon message comprises a typed payload, the typed payload comprising a payload length field followed by payload data field, the payload length field comprising up to five bits that indicate the length in octets of the typed payload.

3. The method of claim 1, wherein the beacon message comprises an extension type octet preceding the main type octet, the extension type octet indicating that the advertising type is an extended advertising type.

4. The method of claim 1, wherein the set of advertising types comprises one or more of: silent mode, flight mode, and hands-free mode.

5. The method of claim 1, wherein the at least one beacon message is transmitted in an undirected advertising event.

6. The method of claim 1, wherein the PDU is one of the following PDU types: ADV_IND, ADV_NONCONN_IND, or ADV_SCAN_IND.

7. A method for receiving a beacon message comprising:
receiving, with a mobile computing device, a beacon message transmitted in an AdvData field of a payload of a protocol data unit (PDU) of a Bluetooth Low Energy advertising channel packet, the beacon message being defined by a beacon message format, the beacon message format comprising one or more type octets, the one or more type octets comprising a main type octet, the main type octet comprising a first bit followed by seven type bits, the seven type bits indicating an advertising type for the beacon message, the advertising type being one of a set of predetermined advertising types that indicate location-based information associated with a location of the mobile computing device, the first bit being either:
a first bit value, to indicate that the beacon message has no typed payload and that no subsequent type octets are present in the beacon message; or
a second bit value, opposite of the first bit value, to indicate that a subsequent one or more octets of the beacon message comprise a typed payload for the beacon message, the typed payload comprising a payload length followed by payload data, the payload length being the length in octets of the typed payload; and
performing at least one action, by the mobile computing device, based at least in part on the location-based information without input from a user.

8. The method of claim 7, wherein the first bit is the second bit value and the beacon message comprises a typed payload, the typed payload comprising a payload length followed by payload data, the payload length comprising up to five bits that indicate the length in octets of the typed payload.

9. The method of claim 7, wherein performing at least one action comprises:

displaying a message to a user of the mobile computing device according to the advertising type of the received beacon message.

10. The method of claim 7, wherein the mobile computing device is configured to receive the beacon message in sleep mode and process the beacon message in firmware without waking from sleep mode.

11. The method of claim 7, wherein performing at least one action comprises:
in response to the received beacon message, wirelessly transmitting data comprising information specific to the mobile computing device or a user of the mobile computing device.

12. The method of claim 7, wherein performing at least one action comprises:
in response to the received beacon message, wirelessly forwarding at least a portion of the beacon message to another computing device.

13. The method of claim 7, wherein the mobile computing device is configured to adjust a local setting of the mobile computing device without input from a user based on the location-based information.

14. The method of claim 13, wherein adjusting a local setting of the mobile computing device comprises switching the mobile computing device to a silent mode.

15. A computer-readable storage device storing computer-executable instructions for causing a mobile computing device to perform operations for receiving a beacon message, the operations comprising:
receiving a beacon message transmitted in an AdvData field of a payload of a protocol data unit (PDU) of a Bluetooth Low Energy advertising channel packet, the beacon message being defined by a beacon message format, the beacon message format comprising one or more type octets, the one or more type octets comprising a main type octet, the main type octet comprising a first bit followed by seven type bits, the seven type bits indicating an advertising type for the beacon message, the advertising type being one of a set of predetermined advertising types that indicate location-based information associated with a location of the mobile computing device, the first bit being either:
a first bit value, to indicate that the beacon message has no typed payload and that no subsequent type octets are present in the beacon message; or
a second bit value, opposite of the first bit value, to indicate that a subsequent one or more octets of the beacon message comprise a typed payload for the beacon message, the typed payload comprising a payload length followed by payload data, the payload length being the length in octets of the typed payload; and
performing at least one action, by the mobile computing device, based at least in part on the location-based information without input from a user.

16. The computer-readable storage device of claim 15, wherein the first bit is the second bit value and the beacon message comprises a typed payload, the typed payload comprising a payload length followed by payload data, the payload length comprising up to five bits that indicate the length in octets of the typed payload.

17. The computer-readable storage device of claim 15, wherein performing at least one action comprises:
displaying a message to a user of the mobile computing device according to the advertising type of the received beacon message.

18. The computer-readable storage device of claim 15, wherein the mobile computing device is configured to receive the beacon message in sleep mode and process the beacon message in firmware without waking from sleep mode.

19. The computer-readable storage device of claim 15, wherein performing at least one action comprises:
   in response to the received beacon message, wirelessly transmitting data comprising information specific to the mobile computing device or a user of the mobile computing device, or wirelessly forwarding at least a portion of the beacon message to another computing device.

20. The computer-readable storage device of claim 15, wherein the mobile computing device is configured to adjust a local setting of the mobile computing device without input from a user based on the location-based information.

\* \* \* \* \*